United States Patent [19]
Eberlein et al.

[11] Patent Number: 5,742,735
[45] Date of Patent: Apr. 21, 1998

[54] DIGITAL ADAPTIVE TRANSFORMATION CODING METHOD

[75] Inventors: Ernst Eberlein, Erlangen; Heinz Gerhäuser, Waischenfeld; Harald Popp, Erlangen; Dieter Seitzer, Erlangen; Hartmut Schott, Erlangen; Karl Heinz Brandenburg, Erlangen, all of Germany

[73] Assignee: Fraunhofer Gesellschaft zur Forderung der Angewanten Forschung e.V., Munich, Germany

[21] Appl. No.: 295,484

[22] Filed: Aug. 25, 1994

Related U.S. Application Data

[63] Continuation of Ser. No. 133,273, Oct. 7, 1993, abandoned, which is a continuation of Ser. No. 982,063, Nov. 25, 1992, abandoned, which is a continuation of Ser. No. 716,769, Jun. 19, 1991, abandoned, which is a continuation of Ser. No. 347,806, filed as PCT/DE88/00618, Oct. 6, 1988, published as WO89/03574, Apr. 20, 1989, abandoned.

[30] Foreign Application Priority Data

Oct. 6, 1987 [DE] Germany ............... 37 33 786.6
Oct. 6, 1987 [DE] Germany ............... 37 33 772.6

[51] Int. Cl.$^6$ ............................................. G10L 9/00
[52] U.S. Cl. ................................. 395/2.38; 395/2.39
[58] Field of Search ............... 381/29–40; 375/122; 395/2.1–2.39

[56] References Cited

U.S. PATENT DOCUMENTS

| | | | |
|---|---|---|---|
| 4,048,443 | 9/1977 | Crochiere et al. | 381/37 |
| 4,386,237 | 5/1983 | Virupaksha et al. | 381/31 |
| 4,455,649 | 6/1984 | Esteban et al. | 381/31 |
| 4,516,258 | 5/1985 | Ching et al. | 381/31 |
| 4,641,238 | 2/1987 | Kneib | 364/200 |
| 4,790,016 | 12/1988 | Mazor et al. | 381/39 |
| 4,811,398 | 3/1989 | Copperi et al. | 381/37 |
| 4,899,384 | 2/1990 | Crouse et al. | 395/2.38 |
| 4,912,763 | 3/1990 | Galand et al. | 395/2.39 |
| 5,018,199 | 5/1991 | Nakagima et al. | 395/2.38 |
| 5,479,562 | 12/1995 | Fiedler et al. | 395/2.38 |

FOREIGN PATENT DOCUMENTS

| | | |
|---|---|---|
| 8603873 | 7/1986 | WIPO . |
| 8801811 | 3/1988 | WIPO . |

*Primary Examiner*—Allen R. MacDonald
*Assistant Examiner*—Vijay B. Chawan
*Attorney, Agent, or Firm*—Barnes & Thornburg

[57] ABSTRACT

A digital adaptive transformation coding method for the transmission and/or storage of audio signals, specifically music signals, wherein N scanned values of the audio signal are transformed into M spectral coefficients, and the coefficients are split up into frequency groups, quantized and then coded. The quantized maximum value of each frequency group is used to define the coarse variation of the spectrum. The same number of bits is assigned to all values in a frequency group. The bits are assigned to the individual frequency groups as a function of the quantized maximum value present in the particular frequency group. A multi-signal processor system is disclosed which is specifically designed for implementation of this method.

10 Claims, 2 Drawing Sheets

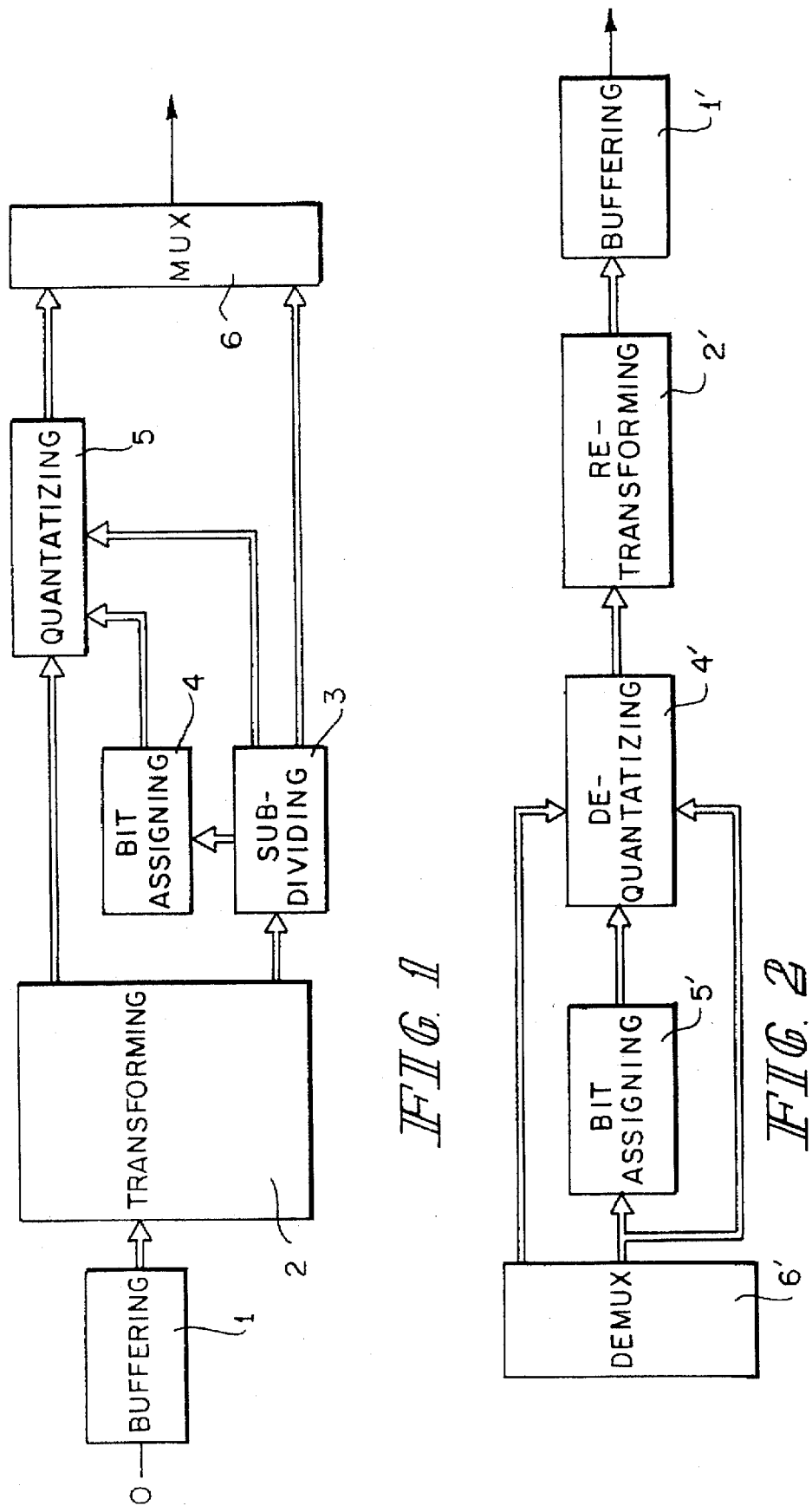

# DIGITAL ADAPTIVE TRANSFORMATION CODING METHOD

This is a continuation of application Ser. No. 08/133,273 filed Oct. 7, 1993 now abandoned which is a continuation of Ser. No. 07/982,063 filed Nov. 25, 1992 now abandoned, which is a continuation of Ser. No. 07/716,769 filed Jun. 19, 1991 now abandoned, which is a continuation of Ser. No. 07/347,806, filed as PCT/DE88/00618, Oct. 6, 1988 published as WO89/03574, Apr. 20, 1989 now abandoned.

FIELD OF THE INVENTION

The present invention relates to a digital adaptive transformation coding method for the transmission and/or storage of audio signals, specifically music signals, as well as to a multi-signal processor system including several digital signal-processing modules for processing a data flow which is particularly well suited for the practical application of the method of according to the present invention.

PRIOR ART

At present, audio signals are normally encoded by means of the so-called pulse code modulation. In this process, music signals are scanned with at least 32 kHz, normally with 44.1 kHz. Thus, with 16 bit linear coding, data rates between 512 and 705.6 kbit/s are achieved.

For this reason, the most different methods of reducing these data volumes have been proposed in the past:

For instance, the German Patent DE-PS 33 10 480 describes a digital adaptive transformation coding method. As far as all other aspects are concerned which are not described in more detail, reference is explicitly made to that publication.

The adaptive transformation coding method provides for a data volume reduction to some 110 kbit/s with an acceptable quality. This known method entails the disadvantage, however, that particularly with critical pieces of music a subjectively perceivable impairment of quality may occur. This may be due, for instance, to the impossibility in these known methods to match parasitic shares in the coded signal with the ear's threshold of audibility, and moreover to potential overshooting and excessively coarse quantization.

Additionally, a genuine real-time realization of the adaptive transformation coding method has not become known. On the one hand, this is due to the complexity of the known methods and on the other hand the reason is to be found in the known multi-signal processor systems which are provided for servicing such methods.

Such multi-signal processor systems are required, for instance, when digital music signals are to be processed and, above all, their data volume is to be reduced, as well as in many other applications such as radar technology, pattern recognition, etc.

Known multi-signal processor systems are so designed that the data flow between the individual signal-processing modules is either hardwired or controlled by means of a program. In any case, the data flow in such systems is difficult to modify or fails to achieve a sufficiently high throughput rate, which are both required for processing digital signals in the audio range. An optimum matching with the respectively intended task normally requires a modification of the system hardware or expensive and complex communication structures such as crossbar distributors.

The adaptation to parameters, which cannot be derived directly from the signal proper, is possible only with considerable influence on the regular program sequence, or even not at all. The adaptation under real-time conditions is thus precluded in most cases.

Moreover, the program development with such systems is complex and expensive while it normally requires additional equipment.

BRIEF DESCRIPTION OF THE INVENTION

The present invention is based on the problem of improving a digital adaptive transformation coding method according to the introductory clause of Patent Claim 1 to the effect that overshooting will no longer occur and that moreover provisions will be made for real-time realization.

Specifically in view of real-time realization of the inventive method, moreover a multi-signal processor system is to be improved to the effect that easy adaption to the respectively set task and high-speed real-time data processing will be made possible.

In the patent claims, one inventive solution of this task is characterized together with its improvements.

In distinction from the known adaptive transformation coding method, the interpolation of the spectrum support values is no longer required so that considerable savings in computing time will be achieved. Moreover, each single-value computation must be made only once per frequency group. This means that with 512 values in the spectrum, subdivided into 46 frequency groups (typical values), merely 46 computations are required whereas in the known method the bit assignment is made on a single-value basis, i.e. 512 individual steps are required.

It was a surprise to detect that in spite of this "coarse bit assignment" the data rate increases only slightly over that common in the known adaptive transformation coding methods, in a typical case to "3.5" bits per scanned value.

Another advantage over the known adaptive transformation coding methods is the fact that overshooting etc. will no longer occur since the coarse variation of the spectrum is defined by the quantized maximum value of each frequency group.

Improvements of the present invention are described in the dependent claims:

It is possible, of course, to quantize in the known manner, e.g. logarithmically or by means of a Max quantizer.

As a result of the formation of an "envelope", which is provided for in the present invention, however, a considerably simplified computation by way of linear quantization will be possible. As only a finite number of known quantization stages will arise the division step, which would be necessary in linear quantization and which can be realized only by means of time-consuming signal processors, may be substituted by multiplication with table access. This means a considerable reduction of the complexity of the structure of a multi-signal processor system which provides for real-time realization.

Another coding improvement is due to the subdivision of the spectral values into frequency groups in terms of psycho-acoustic aspects. With this provision, at low frequencies, the bandwidth is smaller so that less frequency bands have to be employed than in the event of regular subdivision, yet with the same subjective coding quality.

Due to the assignment of a minimum bit number to each frequency group, with the minimum bit number being defined in accordance with psycho-acoustic interrelationships, safeguards are provided so as to ensure that the "quantization noise" will be masked by the desired signal.

The "remaining" or "missing bits" cannot be distributed in an iterative algorithm, as in the known method, for a further reduction of the bit assignment computing time; according to the present invention, excess or missing bits originating from high frequencies are rather assigned to the next location possible. Even though the distribution thus becomes a suboptimum the maximum computing time required is considerably reduced.

Any transformation method may be principally employed for the inventive method, such as the discrete Fourier transformation (DFT), the discrete cosine transformation (DCT) or the so-called TDAC transformation. As far as the TDAC transformation is concerned, which entails a number of advantages specifically in the inventive method, reference is made to the article "Subband/Transform Coding Using Filter Bank Designs Based on Time Domain Aliasing Cancellation" by J. P. Princen, A. W. Johnson and A. B. Bradley.

The retransformation of the coded values may, of course, be realized in an analogous reverse sequence.

In the inventive signal processor system, at least one additional global communication channel is provided these reasons, for flexible data communication, system observation, system control and/or adaptation. As the local communication channel handles the data exchange between adjacent modules the additional global communication channel may be designed to be less complex. And yet the additional communication channel will allow for an alteration of the data flow without any modification of the circuitry, for adaptation without any influence on the program, and for facilitated program development.

The inventive multi-signal processor system thus supports a great number of parallel working concepts, e.g. the data reduction of audio signals and any other problem in digital signal processing.

In the present invention, two global communication channels are provided. This design entails the advantage of the high-speed communication signal rendering available all data paths or threads which will still be necessary whenever recursion will be required or whenever there will be a mutual interference between the global and the local communication channels.

Moreover, with the improvement of the present invention it will become possible that the high-speed global communication channel allows for a randomized data communication which may be realized, for instance, by a communication controller designed as a local node. With such a design, specific provisions will be possible for a dynamic data path distribution which may be a function of data and/or an algorithm. Moreover, a redistribution of the connections will be possible in terms of specific criteria, e.g. the connections may be cyclically switched over.

BRIEF DESCRIPTION OF THE DRAWINGS

In the following, the invention will be described in more detail in consideration of embodiments, with reference to the attached drawings wherein:

FIG. 1 is a flow chart of a coding method in accordance with the present invention;

FIG. 2 is a flow chart of a decoding method in accordance with the present invention;

DESCRIPTION OF EMBODIMENTS

Figure 3:
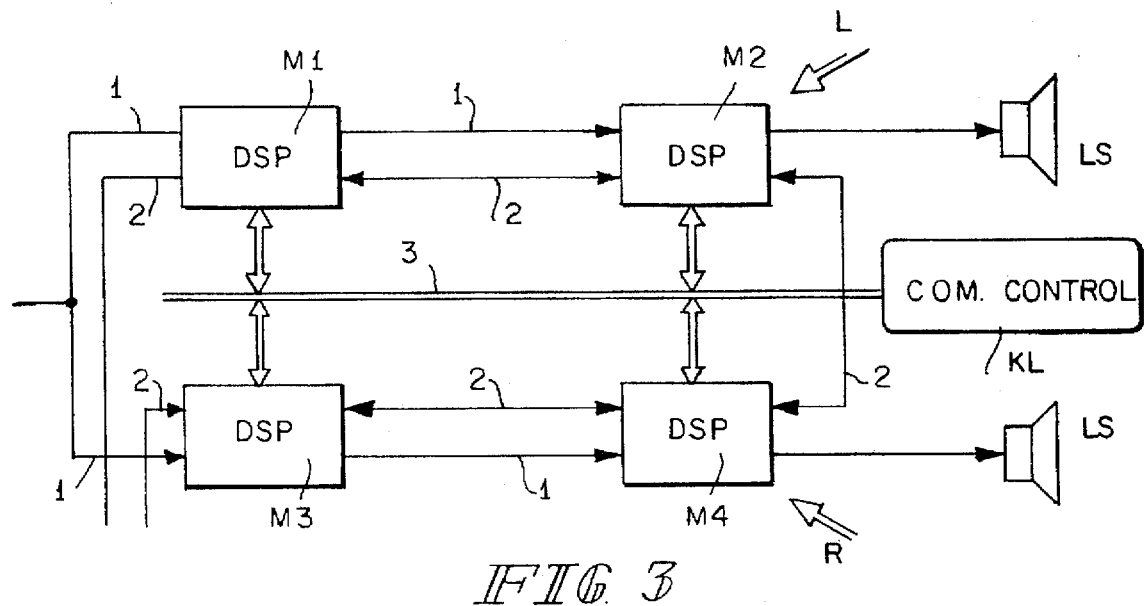
FIG. 3 is a block circuit diagram of a multi-signal processor system in accordance with the present invention.

FIG. 1 is a "block diagram" illustrating the individual steps of one embodiment of a coding method according to the present invention.

In a first step 1, the high data-rate (digital) data flow is buffered and "bounded by a window" in an input buffer. In that step, moreover provisions may be made for level control. This step is implemented substantially like in any other coding method.

In the next step 2, N real input values are transformed into the spectrum range; to this end, for instance, the discrete Fourier transformation (realized with an FF-type transformation), the cosine transformation or the TDAC transformation (DCT with extinction of alias components) may be employed. In this step, the coefficient may also be reduced in the common manner, which is also termed "density storage".

In the third step 3, the spectral coefficients are subdivided into (frequency) groups of different widths in compliance with the "sensitivity curve" of the human hearing ability. In the range of lower frequencies, the bandwidth is narrower. Thus, with the same subjective quality of coding, less frequency bands may be used than in the event of uniform distribution.

The maximum amplitude is then computed and logarithmically quantized so as to define the coarse variation of a frequency band by an "envelope". These values are transmitted to the receiver as additional information.

This inventive formation of the "quantized logarithmic envelope" is a substantial contribution to avoidance of the errors which occur in the conventional ATC method, e.g. as a result of "overshooting".

Additionally, a considerable gain in computing time will be achieved since the computation of the characteristic values of the spectrum or the interpolated spectrum support values, which have so far been formed in prior art methods, will be eliminated.

In the fourth step 4, the bit assignment takes place. The bits are assigned in compliance with the same formula as the one applying to the known ATC step. The bits are not assigned, however, individually for each spectrum value but all the spectrum values in one frequency bend are rather assigned the same number of bits. Thus it is no longer necessary to compute the values individually for 512 different spectrum values, for instance, but only for 46 frequency groups, for example.

In an effort to consider physio-acoustic interrelationships a matched minimum bit number is assigned with each frequency group so as to ensure that the quantizing noise will be masked (covered up) by the effective signal.

Another reduction of the computing time may be achieved by the provision that, in contrast to prior art, "missing" or "remaining" bits are no longer be assigned in an iterative algorithm but rather to the next location possible, starting from high frequencies. Even though this distribution is not an optimum a subjective impairment of the coding result cannot be detected while the computing time is considerably shortened.

Step 5 involves the quantization. Due to the inventive formation of the "envelope" a considerably less complex quantization by means of a linear quantizer will be possible. It will be possible, for instance, to determine, in a very uncomplicated way, an upper threshold of the spectrum values of the respective frequency band from the quantized logarithmic maximum amplitude of a frequency band, e.g. by access to a table.

As only a finite number of known quantization stages is involved the division step, which would be actually required in linear quantization and which is expensive to implement in terms of hardware, may be substituted by multiplication which is easy to realize.

The resulting quantization stage corresponds to:

$$q_{step} = f_{max}/n_{steps}; \quad n_{steps} = 2^{ibit} - 1$$

wherein $f_{max}$ represents the upper threshold, ibit is the assigned number of bits, and $n_{steps}$ is the number of the magnitude stages of the quantizer.

In that case, the quantized value $i_{qx}$ will be:

$$i_{qx} = x/q_{step}$$

wherein x corresponds to the spectrum coefficient to be quantized.

By storage in tables, this calculation may be realized by way of multiplication and memory operations (table access) such that the computation will be considerably facilitated.

An essential advantage over prior art is moreover achieved by the fact that quantization starts from a known upper threshold so that "overshooting" of the quantizer will be precluded.

In step 6, a serial bit flow is finally created in a "multiplexer", which may be transmitted or stored.

The decoding sequence which is shown in FIG. 2 takes place in an analogous "reverse" process. In step 6' demultiplexing takes place, then the bits are assigned (5'), the spectrum values are reconstructed as a reverse operation of quantization (4'), then the values are retransformed (2') and finally the corresponding window-bounding in an output buffer (1') is provided.

In the following, a numerical embodiment will be explained. Without any restriction of the general inventive idea, the block length will be assumed to be M=8 while the overlapping should be 2. Typical values of the block length in practice are 512 or 1024.

Moreover, the spectrum values are to be subdivided into three frequency groups (FG) while 28 bits are available for coding. DFT has been selected as the applicable mode of transformation.

The input values are assumed to be:

| −4736 | −4361 | −3350 | −1933 | −329 | −1176 | 2292 | 3110. |
|---|---|---|---|---|---|---|---|

These values are representative of a typical music signal. Following level control, the following values are obtained in the chosen embodiment:

| −9472 | −8722 | −6700 | −3866 | −658 | 2352 | 4584 | 6220. |
|---|---|---|---|---|---|---|---|

These values are "window-bound" (overlapping 2) using the following window factors:

| .5 | .866 | 1 | 1 | 1 | 1 | .866 | .5 |
|---|---|---|---|---|---|---|---| to furnish:

| −4736 | −7553.5 | −6700 | −3866 | −659 | 2352 | 3969.9 | 3110. |
|---|---|---|---|---|---|---|---|

Additionally, the following distribution to frequency groups has been assumed:

| FG 1: 1 2 | FG 2: 3 4 | FG 3: 5 6 7 |
|---|---|---|

The spectrum coefficient 8 is extinguished.

The respective logarithmic quantized maximum value of the individual frequency groups is:

| | | | |
|---|---|---|---|
| | 4978.6 | 11303.4 | 2222.7 |
| $i_{fl}$ | 50 | 54 | 45 |
| | | (log. envelope in 6-bit representation) | |
| $x_{fl}$ | 5792.6 | 11585.2 | 2435.5 |

6 bits are sufficient to encode the $i_{fl}$ values!

Then the bits are assigned. It should be considered in this step that 7 coefficients are available for distribution since the highest frequency has been cleared.

As 28 bits should be available in this embodiment, the mean number of bits available for distribution is 4.

Computation of the averaged energy=

$$\Sigma_{envelope} \text{ (log.) [ width=343}$$

Thus, in a first approximation, $$bz_{(fl)} = \text{mean number of bits} + \text{actual energy (log)/mean energy}$$

is achieved for the number of bits.

In this example will be obtained:

| 4 | 5 | 2.75 |
|---|---|---|

As a result of physio-acoustic interrelationships, moreover the following minimum bit numbers will be predefined for the three frequency groups in this embodiment:

| 5 | 3 | 1 |
|---|---|---| with the result:

| 5 | 5 | 2.75 |
|---|---|---|

With two bits being distributed, 2/7 bits are uniformly subtracted at every position so that the following bit assignment will be achieved:

| 4.71 | 4.71 | 2.46 |
|---|---|---|

Since, on the other hand, only integer values may occur the following is achieved:

| 5 | 5 | 2 |
|---|---|---|

In all, the following bit numbers have so far been assigned:

$$5*2+5*2+2*3=26$$

which means less than the number of bits available (28). Thus, two 2 bits must be distributed. To this end, a test is made, starting from the high-frequency end, to determine the particular frequency group where this will be possible. This is possible, for the first time, in the second frequency group (FG) so that the following result is achieved in the last analysis:

| 1st FG: 5 bits | 2nd FG: 6 bits | 3rd FG: 2 bits |
|---|---|---|

Then follows the linear quantization. As 5 bits are available in the first frequency group, for instance, a subdivision into 16 stages+sign is provided, with consideration of the envelope $x_H$. An analogous process takes place in the other frequency groups as well.

When the bits will have been combined into one flow, the following total bit flow will be achieved:
00011100101101101011011001011101110111011111100111, which means 50 bits in all.

With an overlapping of 2 and with 8 values, the data rate thus corresponds to:

$$50/6=8.33=bits/scanned\ value.$$

In practice, considerably longer block lengths are processed so that data rates in the range of some 3.5 bits/scanned value will be reached.

Decoding takes place in an analogous manner so that a detailed description of this process may be omitted here.

FIG. 3 is an illustration of a multi-signal processor system which is designed to process audio-stereo signals, without any restriction of the general inventive idea.

In the illustrated embodiment, the stereo channels are broken down into a left channel L and a right channel R, as early as immediately after the signal source. Each channel includes digital signal-processing modules M1, M2 or M3 and M4.

A first communication channel I is provided to connect the signal-processing modules M1 ... M4 to the respectively adjacent module or the digital signal source for the respective stereo channel and corresponding following units such as loudspeakers LS. As the communication signal 1 serves for signal-processing in some kind of "macro pipelining" the communication channel 1 is also termed the local communication channel.

An additional low-speed communication channel 2 and furthermore a high-speed channel 3 are provided, each of which requires a global connection of all modules M1 ... M4.

Figure 4:
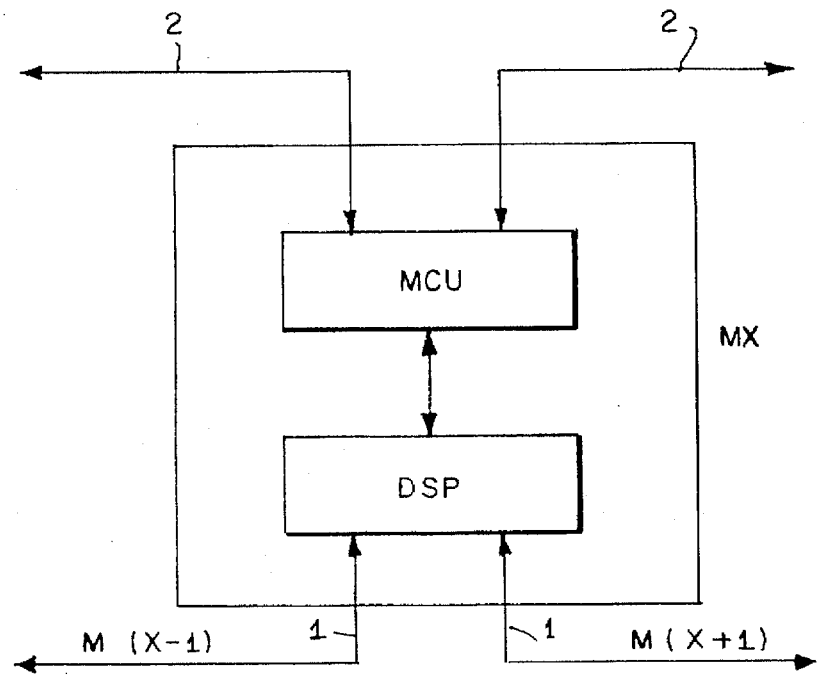
FIG. 4 shows the structure of a module.

FIG. 4 illustrates one embodiment of realization of the low-speed communication channel 2. The modules M consist of a digital signal processor DSP and a micro-controller MCU. The micro-controllers of the individual modules are series-connected. The communication is established and interrupted again via a specific software protocol. The low-speed global communication channel 2 is thus structured like a normal local network, however with the specific feature that the path is not known to the local system and that the establishment of the communication will be controlled from outside, i.e. that there is no local arbitration.

In the illustrated embodiment, the low-speed communication channel 2 is used for system control and parameter adaptation. The high-speed global communication channel 3, however, provides for all the data paths or threads still required.

The high-speed communication channel is realized by means of a so-called communication controller or communication linker KL and has priority precedence over the low-speed communication channel 2.

In this case, the individual modules are interconnected through a microprocessor type bus. In contrast to the known buses suited for multi-master service, the individual modules present largely passive features. The system is under the control of the superset or higher-ranking "communication linker" KL. For this reason, the entire system may be compared to a master-slave structure even though, in contrast to the latter, it opens up the way to manifold new possibilities:

The communication paths are known only to the higher-ranking controller KL. The data communication, however, is demanded from the individual subordinate modules. Then the higher-ranking controller provides for the communication establishment. However, it does not receive the data itself but makes it available to one or even several other modules directly, which require such data in compliance with the structure of the communication system. Therefore, 1 is possible on n connections. The communication controller operates essentially only in the way of a local node.

The local data management is the task of the subordinate or lower-ranking modules. In order to keep the demands to the transmission rates of the individual modules low, on the one hand, and to provide for a sound utilization of the communication channel, on the other hand, so as to achieve a high overall throughput rate, a so-called block-multiplex transmission is possible, which means that the data communication takes place on various paths quasi simultaneously.

As the data paths are known only to the higher-ranking controller the data flow may be easily modified so as ensure an optimum adaptation to the respective application.

The data path distribution may be a function of the data; in such a case it is possible, for instance, to achieve easy adaptation in the event of a stereo pair or two separate mono channels, of a troubled channel, etc. It is also possible, however, to provide for an algorithm-controlled data path distribution. This will be the case, for instance, when a coding method has failed to furnish an acceptable result in the coding step so that it must be repeated with modified parameters.

Additionally, a redistribution of the communication links according to certain schemes is possible, for instance provisions may be made for cyclic switch-over.

Even though the present invention has been described in the foregoing with reference to a particular embodiment, without restriction of the general inventive idea, the most different modifications are possible within the general frame so defined:

The aforedescribed system is, of course, not restricted to two signal-processing modules in series arrangement; as many signal-processing modules in series or even parallel connection may rather be employed as are necessary for a particular application.

Moreover, the system is not only suitable for processing digitized audio signals but rather to process also any data signal such as radar signals, etc.

Moreover, the external micro-controller MCU may also be omitted when the employed digital signal processor DSP includes already a low-speed communication controller, which means that the required MCU components and devices are integrated already on the DSP chip.

It is also possible to switch the low-speed communication channels in series or as a BUS.

It goes without saying that the inventive multi-signal processor system can be realized not only for real-time realization of the aforedescribed method but, of course, also for the realization of any other method such as the so-called OCF process which is described, for instance, in the prior PCT-application DE87/00384.

With the real-time realization of this method,. but also with the aforedescribed version of the method, it is particularly expedient to abort the iteration step in the "worst case", i.e. whenever the computing time necessary for coding, e.g. with the OCF algorithm, will exceed the preset interval provided for real-time realization.

To this end, an optimum output data set is made available which comes very close to the final result which would be achieved if any computing time would be permitted in the "worst case", i.e. with 100% utilization of the digital signal processor DSP, as the approximation to the optimum final condition follows an asymptotic law.

We claim:

1. Digital adaptive transformation coding method for the transmission and/or storage of audio signals, specifically music signals, wherein N scanned values of the audio signal are transformed into M spectral coefficients, wherein N and M are non zero integers, which are subdivided into frequency groups and then quantitized and coded, characterized in that:

a quantitized maximum value of the spectral coefficients of each frequency group is used to define the coarse variation of the spectrum;

the same number of bits is assigned to all spectrum values of a frequency group, wherein the number of bits depend on the quantitized maximum value of the respective spectral coefficient;

the number of bits assigned to each frequency group being adjusted to insure a minimum number of bits to each frequency group such that, in view of psycho-acoustic aspects, quantification noise is masked for that frequency group; and if available after the preceding step, any additional number of bits are assigned to the individual frequency groups in correspondence to the quantitized maximum value occurring in the particular frequency group.

2. Method according to claim 1, characterized in that a logarithmic value of the maximum value of each frequency group is subjected to linear quantization.

3. Method according to claim 2, characterized in that the quantization takes place by multiplication and comparison against a stored table.

4. Method according to claim 1, characterized in that the N scanned values are transformed into M spectral values by means of DFT, DCT or TDAC methods.

5. Multi-signal processor system, specifically for the transmission and/or storage of audio signals, specifically music signals, wherein N scanned values of the audio signal are transformed into M spectral coefficients, wherein N and M are non zero integers, which are subdivided into frequency groups and then quantitized and coded, characterized in that a quantitized maximum value of the spectral coefficients of each frequency group is used to define the coarse variation of the spectrum, that the same number of bits is assigned to all spectrum values of a frequency group, wherein the number of bits depend on the quantitized maximum value of the respective spectral coefficient, that the number of bits assigned to each frequency group being adjusted to insure a minimum number of bits to each frequency group such that, in view of psycho-acoustic aspects, quantification noise is masked for that frequency group, and that if available after the preceding step, any additional number of bits are assigned to the individual frequency groups in correspondence to the quantitized maximum value occurring in the particular frequency group, comprising several digital signal-processing modules (M1 . . . M4) which process a data flow, e.g. a flow of digitized audio signals, and a location communication channel which handles the data communication between two adjacent modules (M1 . . . M4), characterized in that additionally at least one global communication channel is provided via which system observation, system control, parameter adaptation and/or global data communication are realized.

6. Multi-signal processor system according to claim 5, characterized in that two global communication channels are provided whereof the first one is a low-speed communication channel handling the system control and the parameter adaptation while the second one is a high-speed communication channel for data communication.

7. Multi-signal processor system according to claim 6, characterized in that a communication controller (KL) is provided which controls randomized data communication via the high-speed global communication channel.

8. Multi-signal processor system according to claim 7, characterized in that the communication controller (KL) operates as a local communication node.

9. Multi-signal processor system according to claim 7, characterized in that the communication controller (KL) controls data distribution via the high-speed global communication channel as a function of data and/or an algorithm.

10. Multi-signal processor system according to claim 6, characterized in that the high-speed global communication channel has precedence over the low-speed global communication channel in terms of priority.

* * * * *